United States Patent [19]
Childers et al.

[11] Patent Number: 5,793,996
[45] Date of Patent: Aug. 11, 1998

[54] BRIDGE FOR INTERCONNECTING A COMPUTER SYSTEM BUS, AN EXPANSION BUS AND A VIDEO FRAME BUFFER

[75] Inventors: Brian A. Childers, Santa Clara; Eric A. Baden, Saratoga, both of Calif.

[73] Assignee: Apple Computer, Inc., Cupertino, Calif.

[21] Appl. No.: 434,196

[22] Filed: May 3, 1995

[51] Int. Cl.$^6$ ................................................. H01J 13/00
[52] U.S. Cl. ...................... 395/309; 395/306; 395/311; 395/307; 395/287; 395/290; 395/851; 395/858; 395/857; 395/847; 395/509; 395/511; 395/512; 395/520; 395/521; 395/526
[58] Field of Search ........................... 395/289, 290, 395/287, 306, 308, 311, 307, 858, 476, 850, 250, 281, 284, 842, 847, 504, 509, 511, 512, 520, 521, 526

[56] References Cited

U.S. PATENT DOCUMENTS

| | | | |
|---|---|---|---|
| 4,935,868 | 6/1990 | Dulac | 395/308 |
| 5,255,374 | 10/1993 | Aldereguia et al. | 395/308 |
| 5,257,348 | 10/1993 | Roskowski et al. | |
| 5,257,391 | 10/1993 | Dulac et al. | 395/800 |
| 5,263,138 | 11/1993 | Wasserman et al. | |
| 5,274,753 | 12/1993 | Roskowski et al. | |
| 5,301,272 | 4/1994 | Atkins | |
| 5,359,715 | 10/1994 | Heil et al. | 395/308 |
| 5,488,695 | 1/1996 | Cutter | 395/290 |
| 5,544,334 | 8/1996 | Noll | 395/309 |
| 5,553,249 | 9/1996 | Datwyler et al. | 395/308 |
| 5,566,306 | 10/1996 | Ishida | 395/309 |
| 5,596,729 | 1/1997 | Lester et al. | 395/308 |
| 5,606,672 | 2/1997 | Wade | 395/308 |
| 5,611,058 | 3/1997 | Moore et al. | 395/309 |
| 5,619,728 | 4/1997 | Jones et al. | 395/847 |
| 5,621,902 | 4/1997 | Cases et al. | 395/309 |
| 5,634,013 | 5/1997 | Childers et al. | 395/280 |
| 5,640,545 | 6/1997 | Baden et al. | 395/515 |

OTHER PUBLICATIONS

*PowerPC 601 RISC Microprocessor User's Manual*, pp. 2-42 through 2-70; 8-1 through 8-36; and 9-1 through 9-52, published by Motorola in 1993.

*PCI Local Bus Specification*, Review Draft Revision 2.1, published Oct. 21, 1994 by the PCI Special Interest Group, P.O. Box 14070, Portland, OR 97214.

*PCI Multimedia Design Guide*, Revision 1.0 (Mar. 29, 1994), which is distributed by the PCI Multimedia Working Group (part of the PCI Special Interest Group, P.O. Box 14070, Portland, OR 97214).

*Primary Examiner*—Jack B. Harvey
*Assistant Examiner*—Raymond N. Phan
*Attorney, Agent, or Firm*—Burns, Doane, Swecker & Mathis, LLP

[57] ABSTRACT

In a computer system an apparatus interconnects a first bus, a second bus and a frame buffer, wherein the first bus and the second bus are of incompatible bus architecture types. For example the first bus may be a loosely coupled bus having split-bus transaction capability, such as the ARBus, and the second bus may be a tightly ordered bus, such as the PCI local bus. The apparatus includes bridge hardware for converting access requests from the first bus into suitable requests for the second bus. Data paths within the apparatus allow data to be routed from one bus to another. The apparatus further includes a frame buffer controller that is accessible from either of the first or second buses for performing read or write operations from/to the frame buffer. Data path logic allows data to be routed from any of the first bus, second bus and frame buffer to any other one of these three locations. In a preferred embodiment, the data paths are fabricated on a first integrated circuit, and all of control logic is fabricated on a second integrated circuit. The partitioning of hardware in this manner allows for an efficient interface to be provided between the two chips.

12 Claims, 9 Drawing Sheets

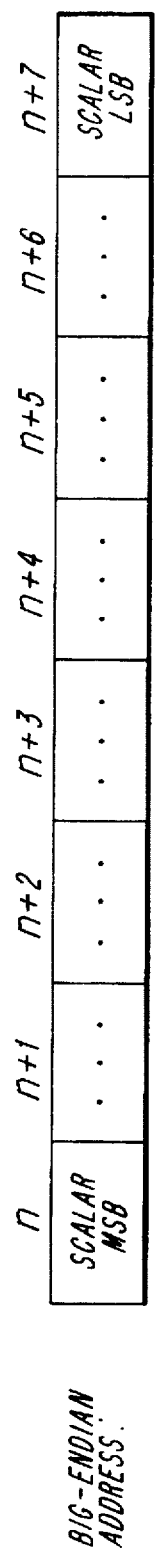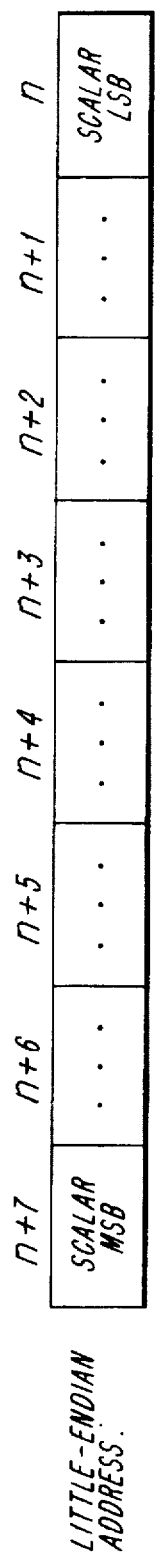
FIG. 2A BIG-ENDIAN ADDRESS.
FIG. 2B LITTLE-ENDIAN ADDRESS.

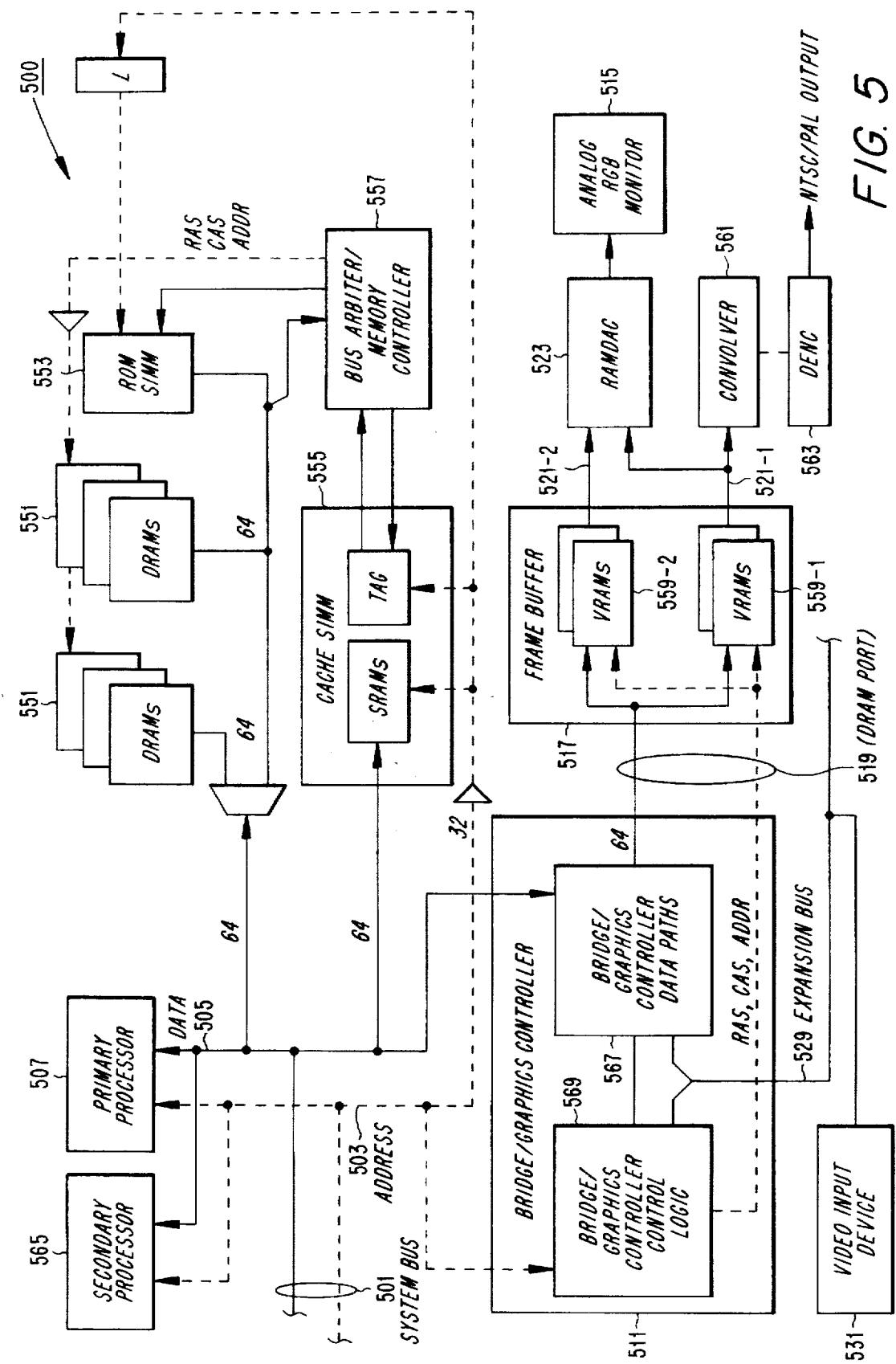

BRIDGE FOR INTERCONNECTING A COMPUTER SYSTEM BUS, AN EXPANSION BUS AND A VIDEO FRAME BUFFER

BACKGROUND

The present invention relates to computer systems, and more particularly to bridges for interconnecting computer system and expansion buses and for providing access to a video frame buffer from either of these buses.

As computers are utilized to perform more and more functions in both the business and home environments, there is an ever increasing desire to improve computer performance. One aspect in particular where the demands for higher performance have been felt relates to computer output methods for presenting information to the user. Over the years, output methods have evolved from flashing lights to the teletypewriter to the cathode ray tube (CRT) monitor. Although initially used primarily for displaying textual information, the computer monitor is now relied on more and more to display a mixture of text, graphics and video information. So-called multimedia applications often combine this visual output with an auditory output as well, thereby creating an even greater need to move information from one or more sources within the computer system to an appropriate output device.

The traditional design of computer systems, especially micro-computer systems, has included a number of processing and peripheral components all connected to a shared system bus. The system bus is the medium through which all data that is to be moved from one system component to another must pass, so the performance of the system is directly correlated to the performance of the bus. The performance of the bus can be particularly important for moving time-sensitive information, such as video input data (pixels) that are being received in real time. Inadequate bus bandwidth characteristics can cause data to be lost, which is an obviously undesirable effect. However, even if a bus is capable of moving data at speeds fast enough to accommodate a real time video source, the fact that more components are now being required to operate simultaneously means that the bus may be occupied and therefore unavailable at a time when a requestor needs it.

Another fact of life that affects system growth is the existence of many manufacturers of computers and peripheral devices. In order to facilitate the interconnection of system components that are made by independently operating manufacturers, a number of bus architectures have been standardized. Each bus architecture specifies the necessary electrical and functional characteristics for allowing one device to communicate with others on the same bus. So long as a manufacturer complies with the standard, its peripherals should be able to communicate with devices made by other compliant manufacturers.

The mere existence of bus standards does not entirely solve the problem, however, because bus characteristics can vary widely from one standard architecture to another. For example, some bus architectures include separate address and data lines, while others use shared lines that are time multiplexed between representing address and data information. Regardless of the physical manifestation, however, a typical computer system bus is conceptually divided into an address bus, a data bus and a control bus. A bus transaction is a complete exchange between two bus devices, and typically comprises both an address phase, during which address information is presented on the address bus, and a data phase during which data information is presented on the data bus. The data phase of a bus transaction may follow the address phase of the same transaction in ordered succession, without any other data phase of any other bus transaction intervening. In such a case, the system bus is said to be "tightly ordered." Small computer systems are, as a general rule, tightly ordered. An example of a standardized tightly ordered bus architecture is the PCI local bus. A complete description of the PCI local bus is presented in the *PCI Local Bus Specification*, Review Draft Revision 2.1, published Oct. 21, 1994 by the PCI Special Interest Group, P.O. Box 14070, Portland, Oreg. 97214, which is incorporated herein by reference in its entirety.

By contrast, in some minicomputer and mainframe computers, and more recently in some small computer architectures, buses are "loosely ordered" such that, between the address phase of a bus transaction and the corresponding data phase, other data phases of other bus transactions may occur. The ability of the bus to allow the address bus and data bus to have different masters at the same time is called "split-bus transaction capability". The PowerPC™ computer architecture, co-developed by Apple Computer, utilizes a loosely ordered system bus that provides split-bus transaction capability.

PowerPC™ machines currently sold by Apple are based largely on the Motorola MPC601 RISC microprocessor. The MPC601 permits separate address bus tenures and data bus tenures, where tenure is defined as the period of bus mastership. In other words, rather than considering the system bus as an indivisible resource and arbitrating for access to the entire bus, the address and data buses are considered as separate resources, and arbitration for access to these two buses may be performed independently. A transaction, or complete exchange between two bus devices, is minimally comprised of an address tenure; one or more data tenures may also be involved in the exchange. The address and data tenures of each access request must be arbitrated separately from one another. However, the request for a data bus tenure is not made explicitly, but is instead implied by the occurrence of a corresponding address bus request/transaction. More information about the particulars of the system bus in the MPC601 RISC microprocessor may be found in the *PowerPC 601 RISC Microprocessor User's Manual*, published by Motorola in 1993, which is incorporated herein by reference in its entirety. Another loosely coupled system bus is described in U.S. patent application Ser. No. 08/432,620, which was filed by James Kelly et al. on May 2, 1995, and entitled BUS TRANSACTION REORDERING USING SIDE-BAND INFORMATION SIGNALS, and which is incorporated herein by reference in its entirety. The bus that is described in U.S. patent application Ser. No. 08/432,620 is a superset of the conventional PowerPC™ 601 microprocessor interface, and is known as the Apple RISC Bus™, or ARBus™.

Because of the availability of different bus standards, a peripheral device cannot be expected to simply plug in to any computer system. In order to avoid limiting the scope of peripherals that are available for use in any computer system, the bus incompatibility problem has been dealt with by the introduction of bus bridges. This is illustrated in FIG. 1 which is a block diagram of a prior art system 100. As shown, a system bus 101 connects together a processor 103 and a memory 105. The memory 105 may store program instructions as well as data. A user may supply data to be processed by, for example, an input keyboard device 107. The output device in this system is a computer monitor 109.

In order to avoid having the processor spend a great proportion of its time keeping the monitor 109 supplied with the proper electrical signals for driving the display, a frame buffer 113, frame buffer controller 111, and random access memory digital-to-analog converter (RAMDAC) 115 are interposed between the processor and the monitor 109. Now when it is desired, say, for the processor 103 to update information that appears on the screen, the processor 103 writes this data to the frame buffer controller 111 which ensures that it is written into the frame buffer 113. The frame buffer 113 is a video random access memory (VRAM) which is a special type of dynamic random access memory (DRAM) that has a DRAM port 117 (from which pixel data may be randomly accessed by an agent connected to the system bus 101) and a serial access memory (SAM) port 119, which supplies a serial stream of pixel data stored in the frame buffer 113. The SAM port 119 is connected to the RAMDAC 115, which reads the serial stream of pixel data from the SAM and converts the digital bit stream into appropriate analog signals for driving the monitor 109.

The system bus 101 is coupled to an otherwise incompatible expansion bus 121 by means of a bridge 123. In this way, components such as the video input device 125 can be incorporated into the system 100. The bridge 123 must include whatever hardware is necessary to enable the video input device 125 to get access to the system bus 101 and write data to the frame buffer controller 111.

Although the prior art system 100 overcomes the hurdle of connecting an expansion bus-type video input device 125 to the system bus 101, there are still problems that must be overcome in order to truly incorporate the video input device 125 into the system 100. For one thing, whenever the video input device 125 is writing data to the frame buffer controller 111, the system bus 101 will be unavailable for use by any of the other components. Of course, this would be true even if the video input device were connected directly to the system bus 101 (i.e., without the intervening bridge 123), as in other prior art systems. This raises serious system performance issues, since, as mentioned before, the real time nature of the video data precludes it from being held off for any significant length of time.

Furthermore, even if the performance issues are resolved, there is still another problem introduced if the system bus 101 and expansion bus 121 have different endian-ness characteristics. The concept of endian-ness derives from the fact that computer representations of scalars (individual computational data items) are not indivisible. If they were, then the order of bits or groups of bits within the smallest addressable unit of memory would be irrelevant, because nothing could be observed about such order. However, as implemented in most computer systems, order does matter because scalars can be made up of more than one addressable unit of memory, despite the fact that the processor and programmer regard them as indivisible quantities.

Consider, for example, the PowerPC™ 601 processor, which is capable of handling a 64-bit double word. If the 64-bit double word were the smallest addressable unit, then there would be no question of the order of bytes within double words. All scalar transfers between registers and system memory would be for double words and the address of the byte containing the high-order eight bits of a scalar would be no different from the address of a byte containing any other part of the scalar.

However, in actuality, the smallest addressable memory unit in the PowerPC™ processor is the byte (8 bits), and most scalars are composed of groups of bytes. When a 32-bit scalar is moved from a register to memory, it occupies four consecutive byte addresses, and a decision must be made regarding the order of these bytes in these four addresses.

The choice of byte ordering is arbitrary. Although there are 24 possible permutations of four bytes, only two are practical: big-endian and little-endian. Big-endian ordering assigns the lowest address to the highest-order eight bits of the scalar. The name "big-endian" derives from the fact that the big end of the scalar, considered as a binary number, comes first in memory. By contrast, little-endian byte ordering assigns the lowest address to the lowest-order (rightmost) 8 bits of the scalar. The little end of the scalar, considered as a binary number, comes first in memory.

The difference between big- and little-endian representations is illustrated in FIGS. 2A and 2B. The storage in memory of a scalar comprising eight bytes of data is illustrated in both figures. As shown in FIG. 2A, in a big-endian system the most significant byte (MSB) is stored at address n, the next byte is stored at address location n+1, and so on until the least significant byte (LSB) is stored at address location n+7. By contrast, the little-endian system illustrated in FIG. 2B shows that, for the same scalar, address n refers to the LSB, with increasing addresses referring to more significant bytes, so that the MSB is stored at address location n+7.

The discussion of endian-ness is pertinent to bus architectures, because modern buses are typically wide enough to transfer multiple bytes in a single data transaction, or "beat". Since all data transfers are accompanied by an associated address (typically a byte-address in most microcomputers), it is important, for proper reception of data, to know which byte (i.e., MSB, LSB or other) the address refers to. Thus, where the system bus 101 and expansion bus 121 have differing endian-ness characteristics, some mechanism must be provided to allow the bridge 123 to convert from one type of address to another before relaying it from one bus to another.

To resolve this general incompatibility, bus bridges sometimes apply a rule of "address invariance", wherein the bytes (or whatever size data unit corresponds to the granularity of bus addresses) on a bus are swapped, end-for-end, whenever they cross from one bus to another. This byte-swapping is illustrated in FIG. 3. It can be seen that by actually reversing the order of the bytes, a big-endian entity's use of, say, address "1" for pointing to byte 1 is the same as a little-endian entity's use of address "1" for pointing to that same item of data. When byte-swapping is not in effect, there is a need to provide a mechanism for converting the address itself as it passes from one bus to another.

While byte-swapping may enable compliance with the address invariance requirements of some standardized buses, it does not, in general, enable pixels received from, say, a little-endian bus to be stored into a big-endian frame buffer 113 because while the byte swapping guarantees that pixels are placed into their proper location on the bus (i.e., address and byte-lanes), bytes within a pixel can be swapped, thereby causing that pixel to be garbled, or scrambled. An illustration will help make this point clear.

Suppose pixels are encoded in a big-endian αRGB 16 bpp (bits per pixel) format (the little-endian encoding scheme would require BGRα). In such a format, αis represented by 1 bit, and the R, G and B codes are each represented by 5 bits of data. In our previous example, where the data bus is capable of conveying 4 bytes of data, a little-endian system would transmit two big-endian pixels per bus cycle in the format shown in FIG. 4A. If the destination of the pixels is a big-endian frame buffer 113 (i.e., the RANDAC 115 requires that big-endian addressing be used to retrieve big-endian pixels), the pixels will undergo the byte swapping previously illustrated in FIG. 3. The results of that byte swapping are shown in FIG. 4B. It can be seen that the order of the two 16-bit pixels has been correctly converted from P1, P0 to P0, P1, but that the pixels themselves have become "scrambled" as a result of their bytes being swapped. In particular, note how the G field in each pixel has been split into two non-contiguous fields, the left-most one occupying the most-significant 3 bits of the pixel and the right-most one occupying the least-significant 2 bits of the pixel. Also, the remaining α, R and B fields are no longer in the proper order.

Similar "pixel scrambling" problems occur when other pixel formats, such as αRGB 32 bpp (α=8 bits; R=8 bits; G=8 bits; and B=8 bits), are transferred between mixed-endian systems. Thus, before such pixels can be stored into the big-endian frame buffer 113, some mechanism for unscrambling needs to be in place.

In view of the many differences between standardized bus architectures, it is apparent that devices that are designed for one bus type cannot be utilized in a system built around an incompatible bus type without the provision of a mechanism for interconnecting the two buses and, in the case of transferring pixel data from one bus to another, ensuring that pixels received from one bus are intelligible when utilized on the other bus. In addition, it is desired that the addition of peripheral devices on an expansion bus 121 not consume an unacceptable amount of the bandwidth of the system bus 101.

SUMMARY

It is therefore an object of the present invention to provide a bridge for interconnecting two buses of otherwise incompatible types.

It is another object of the invention to provide a mechanism in a bus bridge for compensating for endian-related differences between the two buses.

It is yet another object of the invention to provide a mechanism for writing intelligible pixels into a frame buffer from a source on either of two endian-incompatible buses.

It is still a further object of the invention to provide a mechanism for writing pixels into a frame buffer from a source on either of two endian-incompatible buses without having a source on one of the buses occupy resources on the other bus.

It is yet another object of the invention to provide a suitable partitioning of the various functions for implementing the above on two application specific integrated circuits.

In accordance with one aspect of the present invention, the foregoing and other objects are achieved in a combination bridge/graphics controller apparatus for use in a computer system. The inventive apparatus interconnects a first bus, a second bus and a frame buffer. In one embodiment of the invention, the first bus and the second bus are of incompatible bus architecture types. For example the first bus may be a loosely coupled bus having split-bus transaction capability, such as the ARBus™, and the second bus may be a tightly ordered bus, such as the PCI local bus.

In one aspect of the invention, the apparatus comprises first port means for coupling to the first bus; second port means for coupling to the second bus; third port means for coupling to the frame buffer; data path means for switchably routing data received from any of the first, second and third port means to any other one of the first, second and third port means; first bus slave interface means, responsive to a received first request to access a second agent connected to the second bus from a first agent connected to the first bus, for forwarding the first request to a second bus master interface means. The second bus master interface means comprises means for converting the first request into a second request that is suitable for transmission on the second bus, and for transmitting the second request on the second bus; and means for controlling the data path means to alternatively route data from the first bus to the second bus, or from the second bus to the first bus in response to the first request alternatively being a write or a read request. Thus, bus requests from the first bus are mapped, or translated, into equivalent requests to be transmitted on the second bus.

The first bus slave interface means is further responsive to a received third request to access the frame buffer from a first agent connected to the first bus, for forwarding the third request to a frame buffer interface means. The frame buffer interface means controls the data path means and the frame buffer to alternatively route data from the first bus to the frame buffer, or from the frame buffer to the first bus in response to the third request alternatively being a frame buffer write or a frame buffer read request.

In another aspect of the invention, the data path means are fabricated on a first integrated circuit and the first bus slave interface means, the second bus master interface means, and the frame buffer interface means are all fabricated on a second integrated circuit. The first integrated circuit further includes means for coupling to a data bus portion of the first bus; means for coupling to a data bus portion of the second bus; means for coupling to a frame buffer data bus; and means for coupling to a bridge control signal interface. Additionally, the second integrated circuit further includes: means for coupling to address bus and control line portions of the first bus; means for coupling to address bus and control line portions of the second bus; means for coupling to a frame buffer control interface; and the bridge control signal interface for providing control signals for operating the data path means. This partitioning of the combination bridge/frame buffer controller allows an efficient interface to be provided between the two chips whereby a master/slave relationship exists between the second integrated circuit's control hardware and the first integrated circuit's data path hardware.

BRIEF DESCRIPTION OF THE DRAWINGS

The objects and advantages of the invention will be understood by reading the following detailed description in conjunction with the drawings in which:

FIGS. 2A and 2B illustrate the difference between big-endian and little-endian addressing;

FIG. 5 is a block diagram of a computer system in which the present invention is utilized;

DETAILED DESCRIPTION

Figure 1:
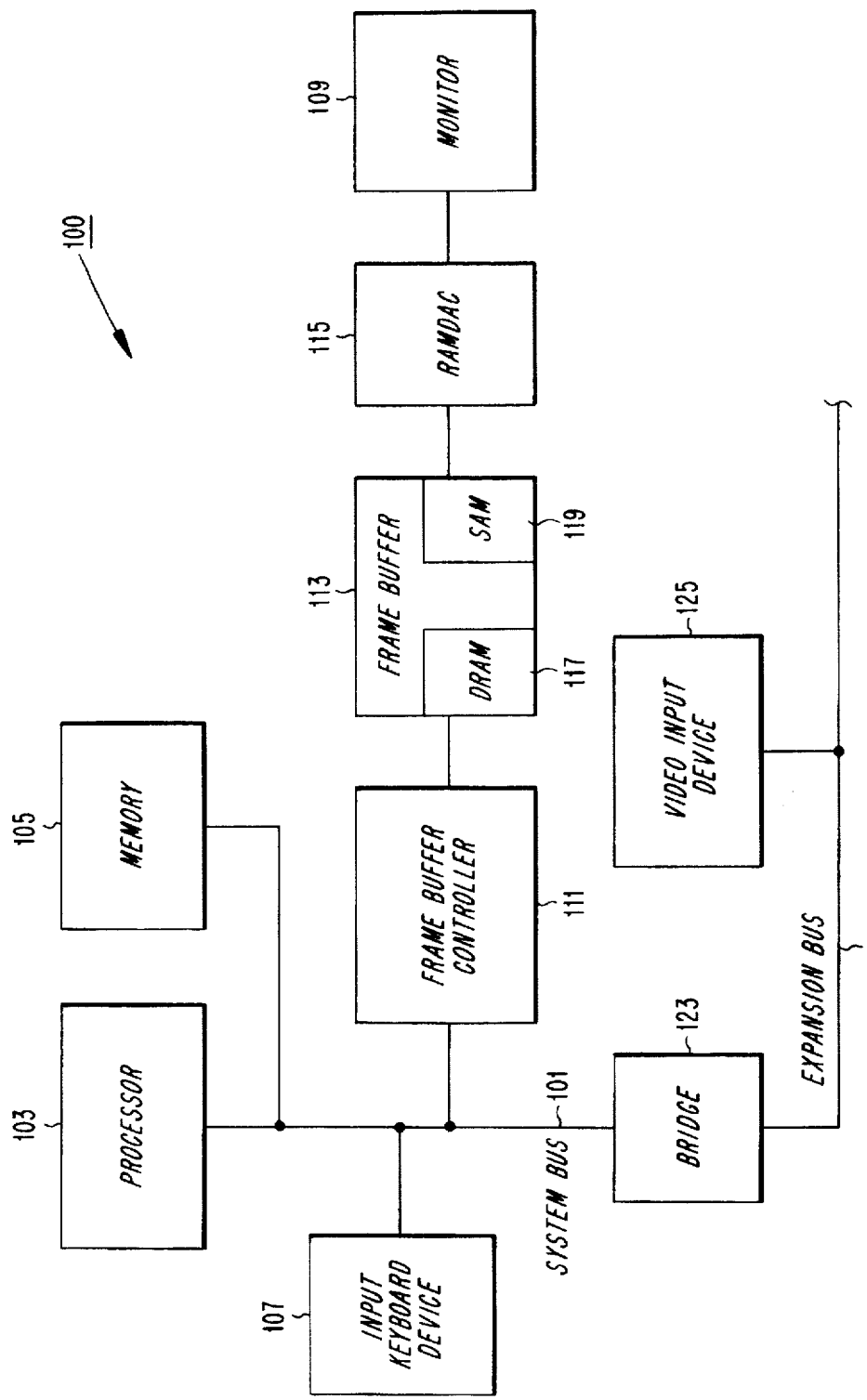
FIG. 1 is a block diagram of a prior art system including a bridge for interconnecting a system bus and an expansion bus.
Figure 3:
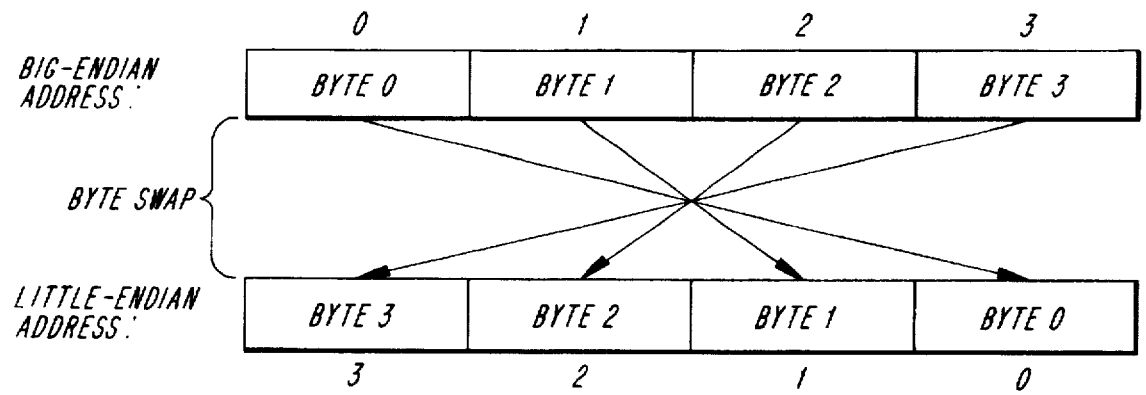
FIG. 3 illustrates the prior art technique of byte-swapping to maintain address invariance in mixed-endian systems.
Figure 4A:
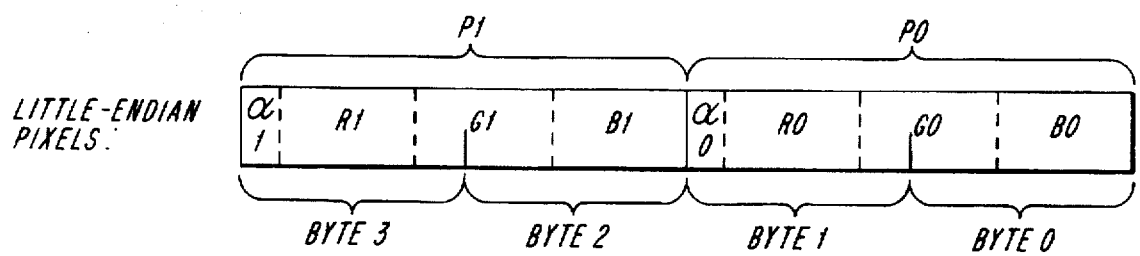
FIGS. 4A and 4B depict the problems introduced by byte-swapping when transmitting pixel data between systems of incompatible endian-ness.
Figure 4B:
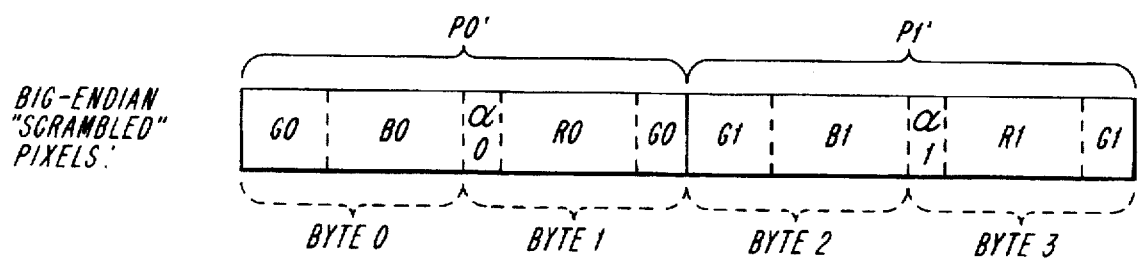

The various features of the invention will now be described with respect to the figures, in which like parts are identified with the same reference characters.

Referring to FIG. 5, the present invention may be used in a computer system 500 of the type shown. It should be understood, however, that the invention is not limited to use only in the illustrated embodiment, but may be used in any environment where it is desired to interconnect two buses and a video subsystem, and in particular it may be designed to interconnect two incompatible buses.

The computer system 500 is based on a system bus 501 that comprises an address bus 503 and a data bus 505. Furthermore, the system bus 501 is preferably of a loosely coupled type that has split-bus transaction capability, such as the ARBus™ described in the BACKGROUND section of this disclosure. Thus, for purposes of this discussion, the data bus 505 may be considered to be 64-bits wide, and the address bus 503 may be considered to be 32-bits wide. The address bus 503 is big-endian and has a granularity of one byte (i.e., the smallest addressable data unit on the bus is one byte, so that incrementing an address by 1 causes one to point to a next byte in sequence).

Attached to the system bus 501 is a primary processor 507, such as the "PowerPC™ 601" microprocessor described above, which is capable of operating in a split-bus transaction environment. A secondary processor (also preferably a "PowerPC™ 601 microprocessor) may also be provided. Also attached to the system bus 501 are various memory units, including DRAMs 551, a ROM SIMM 553 and a cache SIMM 555. The use of these elements is well-known in the art and need not be described here in detail.

The system 500 also includes a bus arbiter/memory controller 557 for resolving conflicting access requests made to the address and data buses 503, 505 as well as for controlling the flow of data to and from the various memory elements.

In the exemplary system 500, image data may be displayed on an analog RGB monitor. An image to be displayed is stored in a frame buffer 517 as a set of pixels, the form of which may be in accordance with any of a number of well-known pixel formats, such as RGB and YUV. The frame buffer 517 preferably comprises two sets of 2 Mbit video random access memories (VRAM) 559, each having a 64-bit DRAM port 519 (from which pixel data may be randomly accessed) and a serial access memory (SAM) for supplying a serial stream of pixel data. The SAM ports 521 are configured to provide a 128-bit datapath to a RAMDAC 523, which reads the serial stream of pixel data from the SAM 521, and converts the digital bit stream into appropriate analog signals for driving the analog RGB monitor 515. The first VRAM 559-1 may be used alone to provide 21" 16 bits per pixel (bpp) monitor support. The presence of the second set of VRAMS 559-2 is optional, and provides for full 21" 32 bpp monitor support. The expansion VRAM 559-2 together with the RAMDAC 523 may also be controlled to support a simple double-buffered framebuffer that provides tear-free updates from rendering engines.

In a preferred embodiment of the system, a convolver 561 and a digital encoder (DENC) 563, such as the Phillips 7187, are connected to the SAM port 521-1 of the first VRAMs 559-1 to allow video output to an NTSC/PAL monitor.

The exemplary system 500 also includes a video input device 531, which is connected to an expansion bus 529. The video input device 531 may, for example, supply pixel data that needs to be written to the frame buffer 517 in real time. In a preferred embodiment of the invention, the expansion bus 529 is a PCI bus as described in the BACKGROUND section of this disclosure. Alternatively, the expansion bus 529 may be a subset of the entire PCI bus architecture in which only the following PCI-defined commands are supported:

Memory Read;
Memory Write;
Configuration Read;
Configuration Write;
Read Multiple;
Memory Read Line; and
Memory Write and Invalidate.

These operations are well-known in the art and are not described here in further detail.

In accordance with the invention, a combination bridge/graphics controller 511 is provided, which has one interface for connection to the system bus 501, another interface for connection to the DRAM port 519 of the frame buffer 517, and a third interface for connection to the expansion bus 529. One function of the bridge/graphics controller 511 is to receive frame buffer access requests alternatively from one or more agents connected to the system bus 501 or from agents connected to the expansion bus 529. The bridge/graphics controller 511 then controls the frame buffer 517 to service these requests, which can be for byte, half-word (=16 bits), word (=32 bits), double-word (=64 bits) or burst (=4×64 bits) quantities of data. In this regard, the bridge/graphics controller 511 is capable of ensuring that pixels are presented in a uniform format (preferably big-endian pixels arranged in big-endian order on a 64-bit wide bus) regardless of the endian characteristic of the bus from which they were received or of the software or apparatus that generated the pixels. The bridge/graphics controller 511 also generates the proper video timing signals for driving the monitor 515. These signals are programmable, and include the blanking signals (for RAMDAC 523) and the Sync pulses (for the monitor 515) necessary to display data on virtually any type of monitor, including progressive scan and interlaced monitors.

In accordance with another aspect of the invention, the bridge/graphics controller also serves as a bridge between the system bus 501 and the expansion bus 529. One aspect of this function is the inclusion of hardware support for conditionally running in an address invariant mode as described in the BACKGROUND section of this disclosure, whereby 64-bit wide data is byte-swapped end-for-end before being passed from one bus to another.

One feature of the invention is the unique architecture for carrying out these and other functions. The bridge/graphics controller 511 preferably comprises two application specific integrated circuits (ASICs), one comprising all of the data flow hardware (the bridge/graphics controller data paths 567, henceforth referred to simply as "data paths 567"), and the other comprising all of the necessary control logic (the bridge/graphics controller control logic 569, henceforth referred to simply as "control logic 569") for carrying out the various functions. An interface between the two ASICs conveys the necessary control signals from the control logic 569 for coordinating the operation of the data paths 567. The organization of the bridge/graphics controller as two ASICs in this way takes into account considerations of speed and width of paths between functional blocks, pin count for each chip, and area for layout on each chip. There is a Master/ Slave relationship between the control logic 569 and the data paths 567.

Figure 6A:
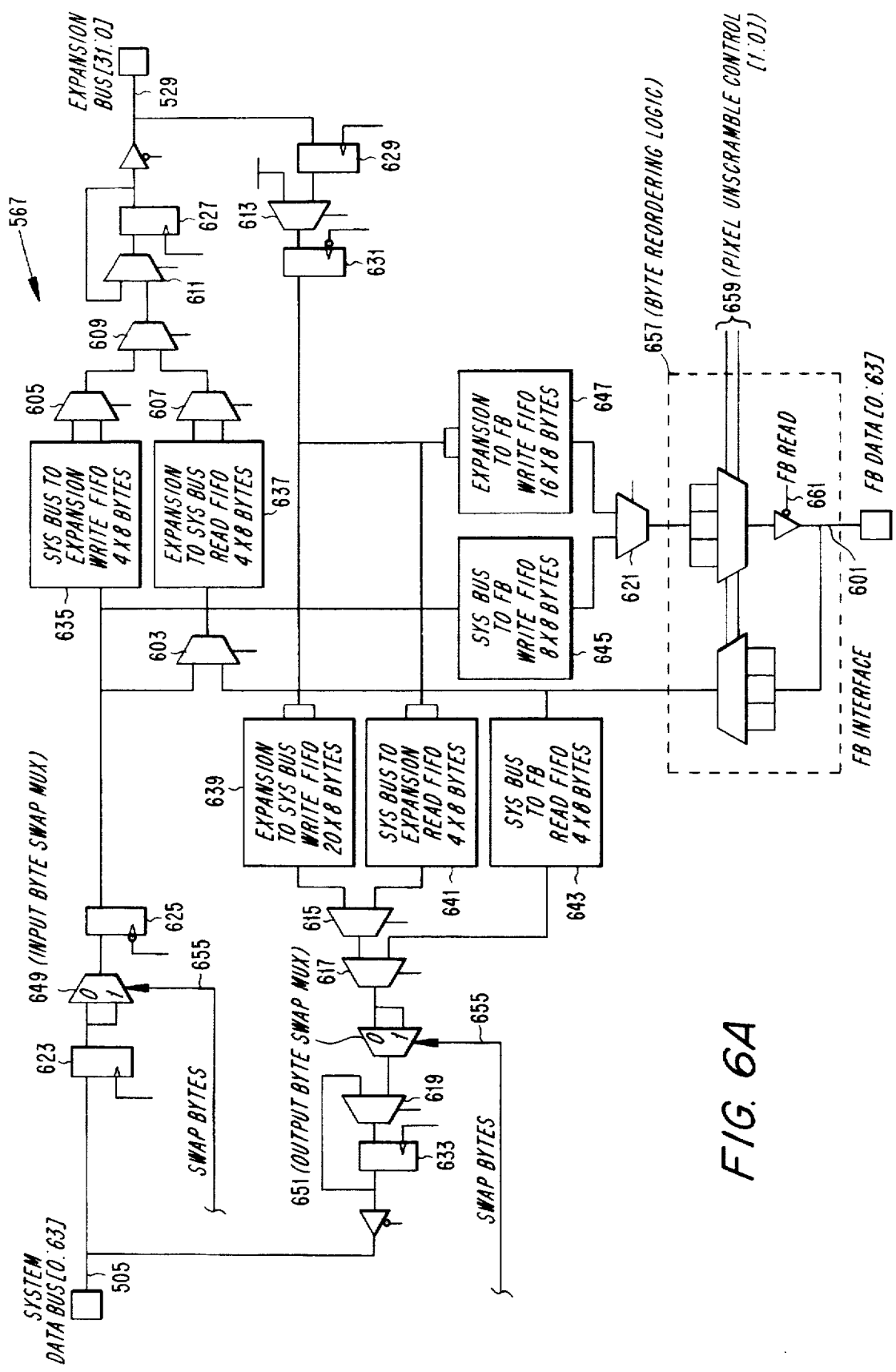
FIGS. 6A and 6B are block diagrams of the overall data flow within the inventive bridge/graphics controller, and of the interface between the data flow and control logic portions of the inventive bridge/graphics controller.

The organization and function of each of the data path 567 and control logic 569 ASICs will now be described in detail. Referring first to FIG. 6A, this is a block diagram of the data paths 567 within the bridge/graphics controller 511. Three data interfaces are provided for connection to the following: the 64-bit wide system data bus 505, the 32-bit wide expansion bus 529 (which, in a preferred embodiment is multiplexed between address and data information), and a 64-bit wide frame buffer (FB) data bus 601. (A fourth interface, the control/data path interface 673 is also provided for communication with the control logic 569, but this is discussed in greater detail below.) Various multiplexors 603, 605, 607, 609, 611, 613, 615, 617, 619, 621 and flip-flops 623, 625, 627, 629, 631, 633 are provided, along with a number of first-in-first-out memory units (FIFOs) 635, 637, 639, 641, 643, 645, 647 that are arranged within the data paths as shown, for switching the data from any one source to any one of the other destinations, for buffering data between the various sources and destinations, and for converting between the 64-bit and 32-bit interfaces.

The seven FIFOs that are included within the data paths 567 will now be described in greater detail:

1) The SysBus-To-ExpansionBus Read FIFO 641

The SysBus-To-ExpansionBus Read FIFO 641 is preferably eight bytes wide and four entries deep. This is a packet buffer for data that is transmitted from the expansion bus 529 to the system data bus 505 as a result of system bus reads of expansion bus address space. The dimensioning of this FIFO as four entries deep makes it large enough to completely buffer the data that returns in response to a burst read operation being issued on the system bus 505.

2) The ExpansionBus-To-SysBus Write FIFO 639

The ExpansionBus-To-SysBus Write FIFO 639 is preferably eight bytes wide and twenty entries deep. This is a packet buffer for data that is transmitted from the expansion bus 529 to the system data bus 505 as a result of expansion bus writes into the system bus address space (e.g., into the DRAMs 551). The selection of twenty entries as the depth of the ExpansionBus-To-SysBus Write FIFO 639 is based on the expectation that a relatively large amount of real time data will be written from the video input device 531 onto the system bus 501. The need to buffer this data arises from an expected high latency in accessing the system bus 501, whose loosely coupled characteristic may result in other data bus requests being queued up ahead of those emanating from the expansion bus 529. A FIFO depth of twenty entries allows five bursts worth of data to be buffered.

3) The ExpansionBus-To-FB Write FIFO 647

The ExpansionBus-To-FB Write FIFO 647 is preferably eight bytes wide and sixteen entries deep. This is a packet buffer for data that is written from the expansion bus 529 to the frame buffer 517. The selection of sixteen as the depth of the ExpansionBus-To-FB Write FIFO 647 reflects the expectation that a relatively large quantity of real time data will be supplied by the video input device 531.

4) The SysBus-To-ExpansionBus Write FIFO 635

The SysBus-To-ExpansionBus Write FIFO 635 is preferably eight bytes wide and four entries deep. This is a packet buffer for data that is transmitted from the system data bus 505 to the expansion bus 529 as a result of system bus writes into the expansion bus address space. The dimensioning of this FIFO as four entries deep makes it large enough to completely buffer the data that may be written in a system bus burst write operation.

5) The ExpansionBus-To-SysBus Read FIFO 637

The ExpansionBus-To-SysBus Read FIFO 637 is preferably eight bytes wide and four entries deep. This is a packet buffer for data that is transmitted from the system data bus 505 to the expansion bus 529 as a result of expansion bus reads of system bus address space. The dimensioning of this FIFO as four entries deep makes it large enough to completely buffer the data that returns in response to a burst read operation being issued on the system bus 505. Note that the multiplexor 603 allows this FIFO to also serve as a buffer for data returning from the frame buffer 517 in response to an expansion bus frame buffer read operation. Having the ExpansionBus-To-SysBus Read FIFO 637 serve double-duty in this manner does not in any way diminish the performance of the bridge/graphics controller 511 because the expansion bus 529 is a tightly ordered bus which cannot issue a second read request without receiving data associated with an outstanding first read request. Thus, it will never be the case that the expansion bus 529 would be expecting data to return from two outstanding read operations.

6) The SysBus-To-FB Write FIFO 645

The SysBus-To-FB Write FIFO 645 is preferably eight bytes wide and eight entries deep. This is a packet buffer for data that is written from the system bus 505 to the frame buffer 517.

7) The SysBus-To-FB Read FIFO 643

The SysBus-To-FB Read FIFO 643 is preferably eight bytes wide and four entries deep. This is a packet buffer for data that is read by the system bus 505 from the frame buffer 517. The reason why the depth of the SysBus-To-FB Write FIFO 645 is preferably twice that of the SysBus-To-FB Read FIFO 643 is that there are typically more writes than reads to a frame buffer. Also, the writes that occur are almost always single-beat writes. Read operations, on the other hand, are almost always bursts (which are more efficient than single beat operations).

The disposition of this FIFO in the return path for frame buffer read operations from the system bus 505 affords great benefits in this split-bus transaction environment, because it eliminates the need for the frame buffer 517 to sit idle waiting for a data tenure to be granted on the system data bus 505, and further because it allows the bridge/graphics controller 511 to postpone requesting a data bus tenure (thereby leaving the system data bus 505 available for use by other system components) until close to the time when the data from the frame buffer 517 will be available. Furthermore, moving the data from the SysBus-To-FB Read FIFO 643 to the requesting agent on the system data bus 505 can occur at a much faster rate than would otherwise be required to make this transfer directly from the frame buffer 517. This feature is described in even greater detail in U.S. patent application Ser. No. 08/434,197, entitled GRAPHICS CONTROLLER FOR PROVIDING ACCESS TO A VIDEO FRAME BUFFER IN A SPLIT-BUS TRANSACTION ENVIRONMENT, to B. Childers et al., filed on even date herewith, which is incorporated herein by reference.

Continuing now with a discussion of additional features of the data paths 567, byte reordering logic 657 is provided at the interface to the frame buffer 517. The byte reordering logic 657 operates in conjunction with the input and output byte swap multiplexors 649, 651 in order to write and read pixel data in a standard format (e.g., big-endian) regardless of the format in which an agent, such as the video input device 531, creates or expects to receive them. The particulars of a preferred embodiment and operation of these logic elements for this purpose are described in detail in U.S. patent application Ser. No. 08/434,191, entitled FRAME BUFFER INTERFACE LOGIC FOR CONVERSION OF PIXEL DATA IN RESPONSE TO DATA FORMAT AND BUS ENDIAN-NESS, to E. Baden et al., filed on even date herewith, which is incorporated herein by reference.

The input and output byte swap multiplexors 649, 651 are disposed within the data paths 567 in order to perform a second function, namely the end-for-end byte swapping that is by some applications to maintain address invariance on both sides of the bridge. Address invariance is a simple rule that says that bytes get mapped across a bridge according to their address (or byte-lane-number); that is, the address of a byte is kept the same on both sides of the bridge by actually performing an end-for-end byte swap of all of the data on the bus. Information about whether the processor is operating in address invariant mode is provided to the control logic 569 by the primary processor 507 during system initialization. The controller stores this information in a corresponding one of its control registers 713 (see FIG. 7, described in detail below).

Figure 6B:
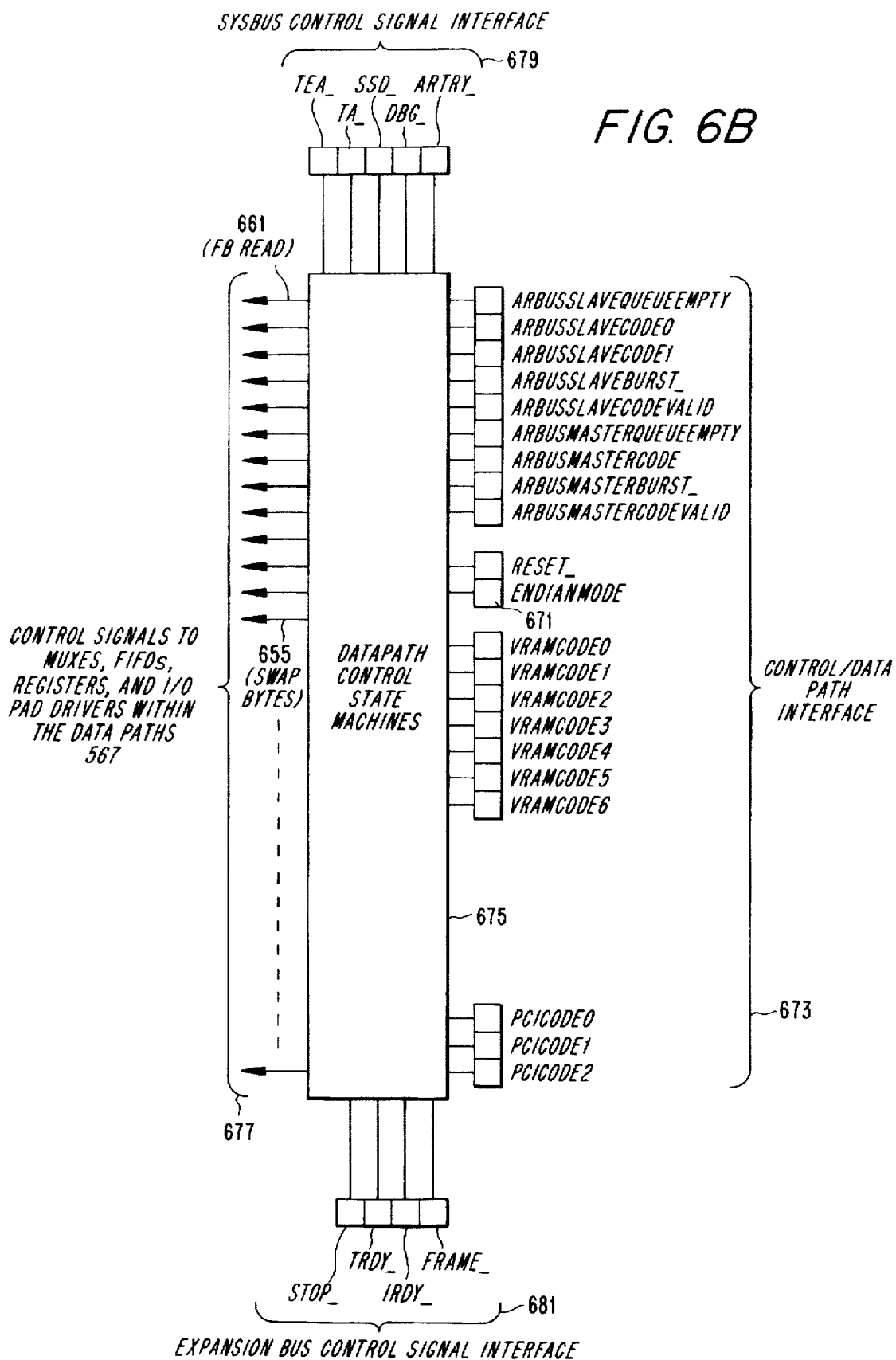

Byte-swapping is activated by assertion of the SWAP BYTES control signal 655, which is derived from the EndianMode signal 671 that the control logic 569 supplies via a control/data path interface 673. The control/data path interface 673 as well as the datapath control state machines 675 that generate all of the control signals 677 that determine the operation of the various multiplexors, FIFOs, registers and I/O pad drivers is illustrated in FIG. 6B. The datapath control state machines 675 are all preferably implemented on the same ASIC that houses the data paths 567, so that the only interface between this ASIC and the one that contains the control logic 569 are those few signals shown in the control/data path interface 673. The datapath control state machines 675 do not determine any high level control of the bridge/graphics controller 511, but instead merely maintain things like the read and write pointers for the various FIFOs on the data paths 567. High level control, however, is entirely performed by the control logic 569.

The datapath control state machines 675 generate the control signals 677 from the illustrated signals received in the control/data path interface 673 in conjunction with bus arbitration related signals from the system bus control signal interface 679 and from the expansion bus control signal interface 681. Implementation of the datapath control state machines 675 for generating the control signals 677 is a straightforward task for one having ordinary skill in the art, given the signals defined by the control/data path interface 673 and the functional description of the data paths 567. Therefore, a more detailed description of these state machines is unnecessary. It is further noted that the control signals 677 which go to the various multiplexors, FIFOs, registers and I/O pads within the data paths 567 have been, for the most part, omitted from FIG. 6A, in order to avoid obfuscating the drawing. Instead, the control signal connections are believed to be clearly inferred from the types of components illustrated in FIG. 6A in conjunction with the discussion of their respective functions.

The signals that constitute a preferred embodiment of the control/data path interface 673 are defined as follows:

System Bus Slave Interface 707 Signals

Some of the signals in the control/data path interface 673 are generated by the system bus slave interface 707 (see FIG. 7 and discussion below). These are:

1) ARBusSlaveCodeValid: When asserted, indicates that the ARBusSlaveCode0 and ARBusSlaveCode1 signals convey meaningful data.

2) ARBusSlaveCode0: Indicates whether a system bus transaction is a read or a write operation.

3) ARBusSlaveCode1: Indicates whether the intended recipient of a system bus transaction is the frame buffer 517 or on the expansion bus 529.

4) ARBusSlaveQueueEmpty: Signal from the system bus slave interface 707 to indicate that the Address Queue contained in the system bus slave interface 707 is empty. This particular address queue stores addresses associated with reads or writes from/to the frame buffer 517 or the expansion bus 529. In a preferred embodiment of the invention, the queuing of addresses from the system bus 301 is performed in accordance with the techniques described in detail in U.S. patent application Ser. No. 08/434,193, entitled METHOD AND APPARATUS FOR PRESENTING AN ACCESS REQUEST FROM A COMPUTER SYSTEM BUS TO A SYSTEM RESOURCE, to B. Childers et al., filed on even date herewith, which is incorporated herein by reference.

5) ARBusSlaveBurst_: Signal from the system bus slave interface 707 to indicate that a transaction emanating from the system bus 501 involves a data burst phase. (The underscore, "_", in the signal name indicates that the signal is active when low.)

System Bus Master Interface 705 Signals

Some of the signals in the control/data path interface 673 are generated by the system bus master interface 705 (see FIG. 7 and discussion below). These are:

1) ARBusMasterCodeValid: When asserted, indicates that the ARBusMasterCode signal conveys meaningful data.

2) ARBusMasterCode: Indicates whether a transaction is a read or a write operation.

3) ARBusMasterQueueEmpty: Signal from the system bus master interface 705 to indicate that the Address Queue contained in the system bus master interface 705 is empty. This particular address queue stores transaction information (i.e., whether a transaction is a read or a write and whether it is a single beat or burst operation) for those transactions whose address tenures have completed and are waiting for the data tenures to occur.

4) ARBusMasterBurst_: Signal from the system bus master interface 705 to indicate that a data burst phase is to be performed. (The underscore, "_", in the signal name indicates that the signal is active when low.)

Control Registers 713 Signals

Some of the signals in the control/data path interface 673 are generated by the control registers 713 (see FIG. 7 and discussion below). These are:

1) Reset_: When asserted low, indicates that a reset operation is occurring.

2) EndianMode: Control register signal that is initialized by the primary processor 507. When set to 1'b1, indicates that the primary processor 507 is operating as a little-endian mode machine. Setting this bit to 1'b0 indicates operation as a big-endian mode machine.

VRAM State Machine 719 Signals

Some of the signals in the control/data path interface 673 are generated by the VRAM State machines 719 (see FIG. 7 and discussion below). These are:

1) VRAMCode0: When asserted, indicates that the remaining VRAMCodes convey meaningful data.

2) VRAMCode2, VRAMCode1: These two signals are encoded as follows:

0,0: Frame buffer pixel depth is 32 bbp;
0,1: Frame buffer pixel depth is 16 bpp;
1,0: Frame buffer pixel depth is 8 bpp;
1,1: Not used.

3) VRAMCode4, VRAMCode3: These two signals are encoded as follows:

- 0,0: Current operation is a write from the expansion bus 529 to the frame buffer 517;
- 0,1: Current operation is a read from the frame buffer 517 to the expansion bus 529;
- 1,0: Current operation is a write from the system bus 501 to the frame buffer 517; and
- 1,1: Current operation is a read from the frame buffer 517 to the system bus 501.

4) VRAMCode5: Active low to indicate that data should be strobed. The source and destination of the data are designated by VRAMCode4 and VRAMCode3 as encoded above.

5) VRAMCode6: When equal to 1'b1, this signal indicates that an agent is accessing a little-endian aperture of the frame buffer. Otherwise, a big-endian aperture is being accessed. Such apertures are described in detail in U.S. patent application Ser. No. 08/434,191, entitled FRAME BUFFER INTERFACE LOGIC FOR CONVERSION OF PIXEL DATA IN RESPONSE TO DATA FORMAT AND BUS ENDIAN-NESS, to E. Baden et al., which was incorporated by reference above.

Expansion Bus Master and Slave Interface 709, 711 Signals

Some of the signals in the control/data path interface 673 are generated by the expansion bus address multiplexors and code logic 717, based on signals received from the expansion bus master and slave interfaces 711, 709 (see FIG. 7 and discussion below). These are three signals called PCICode2, PCICode1, PCICode0 which together are encoded as follows:

- 0,0,0: Indicates that the expansion bus 529 is idle;
- 0,0,1: This is a control signal for writing data into the SysBus-To-Expansion Bus Read FIFO 641.
- 0,1,0: This is a control signal for writing data into the ExpansionBus-To-SysBus write FIFO 639;
- 0,1,1: This is a control signal for writing data into the ExpansionBus-To-FB write FIFO 647;
- 1,0,0: This is a control signal for reading data from the SysBus-To-ExpansionBus write FIFO 635;
- 1,0,1: This is a control signal for reading data from the ExpansionBus-To-SysBus read FIFO 637;
- 1,1,0: This encoding is not used; and
- 1,1,1: Generated by the expansion bus master interface 709 to indicate that an Abort is to occur. In response to an Abort, the data paths 567 are controlled to terminate the ongoing bus cycle.

As previously mentioned, the bridge/graphics controller 511 includes control logic 569 which is preferably implemented as a separate ASIC from that described above with respect to the data paths 567. The control logic 569 will now be described in further detail with reference to FIG. 7.

The primary purpose of the control logic 569 is to efficiently control the flow of graphics and video data (data) between the various components of the system 500. Along with the control of data movement, the control logic 569 generates monitor control signals for displaying this data, and controls the bridging function between the system bus 501 and the expansion bus 529.

Figure 7:
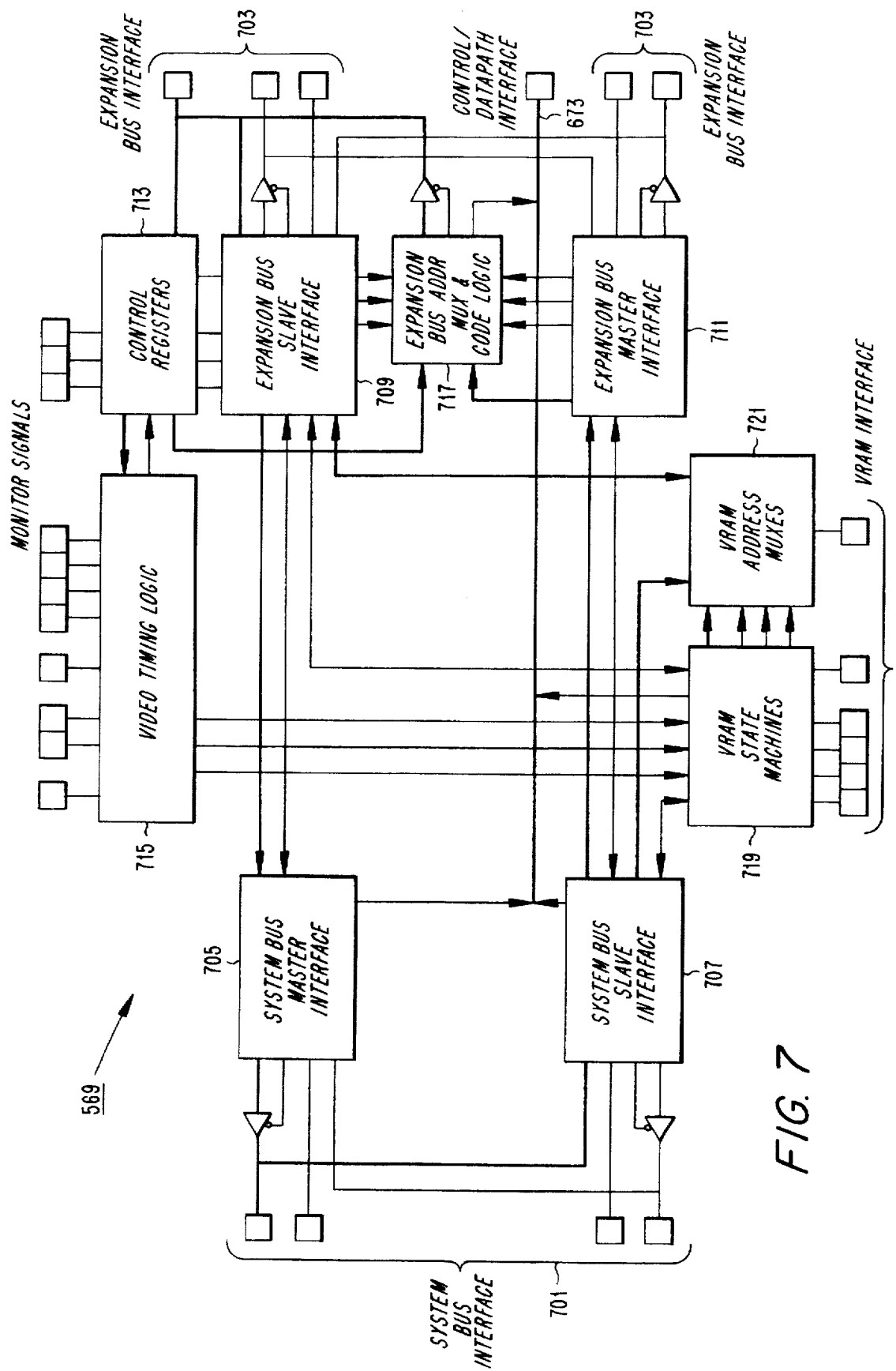
FIG. 7 is a block diagram of the hardware functions that are incorporated into the control logic in accordance with the present invention.

To accomplish these functions, the control logic 569 preferably includes the hardware depicted in FIG. 7. The control logic 569 receives data transfer requests from the system bus interface 701, and from the expansion bus interface 703. The design of the control logic 569 optimizes the transfers generated by these requestors. The key elements within the control logic 569 are:

System bus master interface 705

This block of logic receives requests from the expansion bus slave interface 709, and responds by generating system bus address phases as defined in Table 1, below. It should be recalled, in reading this table, that the expansion bus 529 is preferably a PCI bus, and the system bus 501 is preferably an ARBus™.

TABLE 1

EXPANSION BUS TO SYSTEM BUS TRANSLATIONS

| Expans. Bus Transaction Type | Size | Alignment | System Bus Transaction Type | Size | Alignment | Number Of Phase | Addressing |
|---|---|---|---|---|---|---|---|
| RD | 1–8 bytes | Byte Aligned | RD | 1–8 bytes | Same as Srce | 1 | |
| RD | Rd Mult | Not 32-byte aligned | RD | Burst | Same as Srce | 1 | Disconnect at cache line boundary |
| RD | Rd Mult | 32-byte | RD | Burst | Same as Srce | 1 | Disconnect at cache line boundary |
| WR | 1–8 bytes | Byte Aligned | WR | 1–8 bytes | Same as Srce | 1 | Contiguous ByteEnbls |
| WR | Burst with Inval | 32 bytes | WR | Bursts | Same as Srce | 1 | ByteEnbls ignored |

System bus slave interface 707

This block of logic receives address phases from the system address bus 503 (and associated control signals on the system bus 501) and decodes them to see whether they refer to address spaces associated with either of the expansion bus 529 or the frame buffer 517. Recognized address phases are passed either to the expansion bus master interface 711 or to the VRAM state machine 719.

In order to reduce latency when reading or writing the frame buffer 517, the system bus slave interface includes a special queuing mechanism, whereby addresses associated with read operations and write operations for which no data phases have yet occurred are maintained in one queue, and addresses associated only with write operations for which at least one associated data phase has occurred are stored in a second queue. Furthermore, special bypass multiplexors are employed to eliminate delay times associated with address propagation through an empty queue. This preferred technique is described in detail in U.S. patent application Ser. No. 08/434,193, entitled METHOD AND APPARATUS FOR PRESENTING AN ACCESS REQUEST FROM A COMPUTER SYSTEM BUS TO A SYSTEM RESOURCE, to B. Childers et al., filed on even date herewith, which was incorporated herein by reference above.

Expansion bus slave interface 709

This block of logic receives access requests from the expansion bus 529, and passes them to an appropriate one of the system bus master interface 705, the control registers 713 (for reading and writing control registers 713), or the VRAM state machines 719, based on the type of transaction request received from the expansion bus 529. In a preferred embodiment of the invention, it is unnecessary to convert expansion bus addresses for use with either the frame buffer 517 or with any agent connected to the system bus 501. For transactions aimed at the frame buffer 517, the upper 29 bits of the address are used in combination with the eight byte enable signals. For transactions aimed at the system bus 501, the upper 29 bits of the address are used, with the lower three bits of the address as well as the size indicators being generated from the expansion bus' byte enable signals.

Expansion bus master interface 711

This block of logic receives access requests from the system bus slave interface 707 and generates corresponding expansion bus cycles in response. This function is described in greater detail in Table 2, below. In reading this Table, it should be recalled that the system bus 501 is preferably an ARBus™, and that the expansion bus 529 is preferably a PCI bus or PCI subset as described above.

The code logic part of the expansion bus address multiplexors and code logic block 717 generates the PCICode0, PCICode1 and PCICode2 signals based on signals received from the expansion bus master and slave interfaces 711, 709. These signals are described in detail above.

In addition, multiplexors within the multiplexors and code logic block 717 multiplexes the address from the expansion bus master interface 711 with the register data from the control registers 713. This provides a read data path from the control registers 713 to the expansion bus 529 whenever a register read operation is performed.

VRAM state machines 719

This block of logic includes an address generator for generating the addresses and the requests for the SAM port transfers associated with the RAMDAC output to the monitor 515.

The VRAM state machines 719 also control all parallel port accesses to the VRAMs 559 and also control the accesses to the SAM port 521 for those VRAMs 521 that drive the RAMDAC 523.

The VRAM state machines 719 also generate the refresh cycles for the VRAMs and interface with the convolver 561 to support SAM port accesses for video out.

The VRAM state machines 719 generate byte, half-word, word, double-word or burst (four times 64 bits) read and write accesses from access requests made by the system bus slave interface 707 and by the expansion bus slave interface 709. The VRAM state machines 719 also generate the necessary control signals for operating the byte reordering logic 657, which in combination with the input and output

TABLE 2

System Bus to Expansion Bus translation

| System Bus Transaction Type | Size | Alignment | Expans. Bus Transaction Type | Size | Alignment | Number of data phases | Addr'g |
|---|---|---|---|---|---|---|---|
| RD | 1–8 bytes | Byte Aligned | RD | 1–4 bytes | Same as Srce | 1 or 2 | Linear |
| RD | Burst | 32 bytes | MemRdLine | Line | Same as Srce | 8 | Linear |
| RD | Burst | 24 bytes | MemRdLine | Line | Same as Srce | 6 | Linear |
|  |  | Followed by | MemRdLine | 4 bytes | Wrap to line | 2 | Linear |
| RD | Burst | 16 bytes | RD | 4 bytes | Same as Srce | 4 | Linear |
|  |  | Followed by | RD | 4 bytes | Wrap to line | 4 | Linear |
| RD | Burst | 8 bytes | RD | 4 bytes | Same as Srce | 2 | Linear |
|  |  | Followed by | RD | Line | Wrap to line | 6 | Linear |
| WR | 1–8 bytes | Byte Aligned | WR | 1–4 bytes | Same as Srce | 2 |  |
| WR | Burst | 32 bytes | WR | WR & Inval | Same as Srce | 8 | Linear |

Because of endian-incompatibility as well as differences in the widths of their respective data buses, it is also necessary to convert addresses that are received from the system bus interface 701 into suitable addresses for use on the expansion bus interface 703. The expansion bus master interface 711 performs this function, preferably in accordance with the techniques described in U.S. patent application Ser. No. 08/434,183, entitled BUS BRIDGE ADDRESS TRANSLATOR, to B. Childers et al., filed on even date herewith, which is incorporated herein by reference.

Video timing logic 715

This block of logic generates the timing signals for controlling an attached monitor 515. The generation of these signals is programmable based on values that are stored into the control registers 713 during an initialization phase of the bridge/graphics controller operation.

Expansion bus address multiplexors and code logic block 717 byte swap multiplexors 649, 651 (which are controlled by the SWAP BYTES control signal 655 supplied by the control registers 713) constitutes the pixel unscrambling logic described above. This is preferably done in accordance with the techniques described in U.S. patent application Ser. No. 08/434,191, entitled FRAME BUFFER INTERFACE LOGIC FOR CONVERSION OF PIXEL DATA IN RESPONSE TO DATA FORMAT AND BUS ENDIAN-NESS, to E. Baden et al., which was incorporated by reference above.

As mentioned above, requests for frame buffer accesses can arise concurrently from five independent sources: 1) requests by the convolver 561 for data to be transferred to the SAM 521-1 (referred to as a "secondary SAM request"); 2) requests by the VRAM state machines 719 for data to be transferred to either of the SAMs 521-1, 521-2 in order to output data to the RAMDAC 523 for display on the monitor 515 (referred to as a "primary SAM request"); 3) transfers to an agent on the expansion bus 529; 4) transfers to an agent on the system bus 501; and 5) transfers for refreshing the VRAMs 559 (requests generated by the VRAM state machine itself). In order to resolve these possibly conflicting requests in a way that satisfies the latency requirements of all requesters, the VRAM state machines 719 further include an arbiter to control which source of access requests gets the VRAMs 559 at any particular moment. The strategy for performing this arbitration is described in detail in U.S. patent application Ser. No. 08/434,182, entitled ARBITRATION OF COMPUTER RESOURCE ACCESS REQUESTS, to E. Baden et al., filed on even date herewith, which is incorporated herein by reference.

As noted above, the frame buffer is mapped into expansion bus memory space and is located via the Frame Buffer Base Addresses register, which is one of the control registers 713. Software must ensure that the frame buffer address space does not overlap with any other expansion bus address spaces. The frame buffer preferably consumes not less than 64 MB of one of the four 256 MByte ranges within this space. It is aligned to not less than 64 MB of one of the four 256 MByte ranges within this space. Given these limitations, the base address is completely programmable.

Under control of the VRAM state machines 719, the frame buffer 517 supports two banks of VRAMs which utilize an address aliasing technique, such as that described in U.S. Pat. No. 5,301,272, entitled METHOD AND APPARATUS FOR ADDRESS SPACE ALIASING TO IDENTIFY PIXEL TYPES, to M. Atkins, which is incorporated herein by reference. The address aliasing technique maps the frame buffer 517 into two modes. In 'd128' mode (designated, e.g., by addresses less than 0x00800000), the banks comprise a single 4 MByte frame buffer with a base at the Frame Buffer base address register. Alternatively, in 'd64' mode, the two banks can be addressed individually, each with their own base addresses, or mirrored such that a write to a mirror alias address space results in the same data being written to both banks. It should be noted that a read from the Mirror Alias accesses bank 0. This mirror alias provides the support for simultaneous video and graphics output with the same image. The 'd64' mode provides support for hardware double buffering or two independent frame buffers—one for RGB and one for video—with independent pixel depths.

In 'd64' mode the base of Bank 0 (the standard bank) is defined by the frame buffer base address register plus 0x00400000 (4 MBytes), the base of bank 1 is defined by the Frame Buffer base address register plus 0x00600000 (6 MBytes), and the base of the Mirror Alias bank(s) is defined by the Frame Buffer base address register. In 'd128' mode the base of the entire Frame Buffer is defined by the Frame Buffer base address register.

Also as previously mentioned, the VRAM state machines 719 support bi-endian accesses such that two separate accesses to the same physical memory location in the frame buffer can provide little endian or big endian pixels. These accesses are distinguished by their address (there is a little endian address and a separate big endian address for each byte in the frame buffer 517). Big endian addresses are distinguished from little endian addresses by adding, for example, an additional 0x00800000 to the memory address for big endian accesses. This addition is true, independent of the mode—both 'd128' mode and 'd64' mode use the same addition to distinguish big- versus little-endian pixels. Note that the address variation allows writing consecutive big and little endian pixels and that the control logic 569 supports these accesses and ensures that the correct byte lanes are written in each case.

VRAM address multiplexors 721

Figure 8:
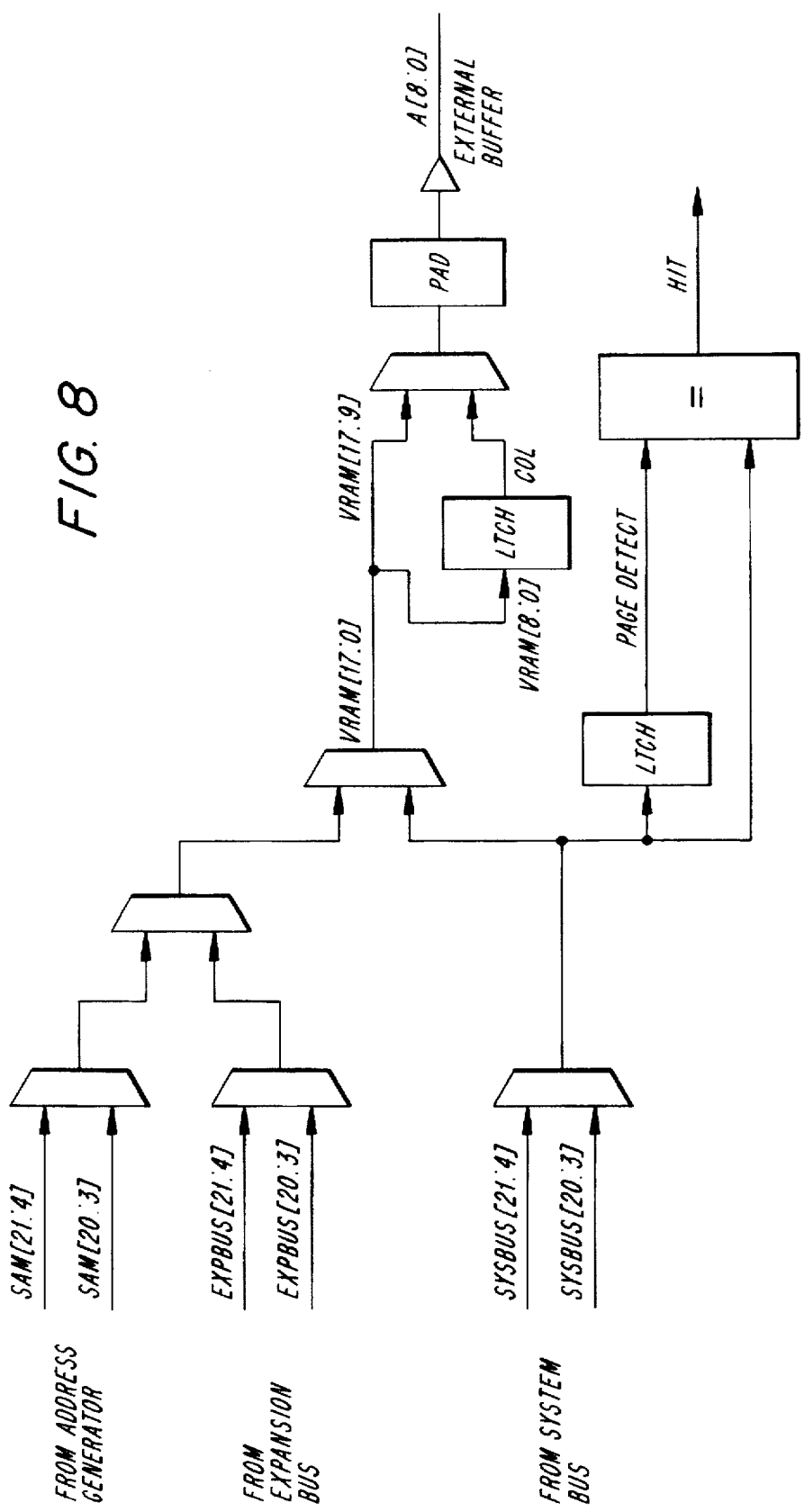
FIG. 8 is a logic diagram of the VRAM address multiplexors in accordance with the present invention.

The VRAM address multiplexors 721 receive addresses from the system bus slave interface 707, the expansion bus slave interface 709, and the VRAM state machines 719, and multiplex these addresses into the appropriate row and column address for the VRAMs 521 based on configuration (i.e., 'd64' mode versus 'd128' mode) and pixel depth (i.e., the number of bits per pixel). One of the control registers 713 is loaded with this value from, preferably, the primary processor 507 during bridge/graphics controller initialization. The VRAM address multiplexors 721 also include the page detection logic for single beat writes from the system bus 501 to the VRAMs 559. A detailed block diagram of the VRAM address multiplexors 721 is presented in FIG. 8. From each of the possible address sources (i.e., address generator, expansion bus 529 or system bus 501), the choice of selecting either bits |21:4| or bits |20:3| is based on whether 'd128' or 'd64' mode is in effect.

Control registers 713

This is a block of registers for storing all of the parameters utilized by the control logic 569. These include parameters associated with the video timing logic, as well as expansion bus configuration registers and registers for storing other control values (such as Endian mode, which is preferably initialized by the primary processor 507).

With respect to the configuration registers, it is noted that the bridge/graphics controller 511 responds to addresses on the system bus 501 and the expansion bus 529 as a function of addresses loaded into respective base address registers that exist in the control registers 713. In general, if an address is responded to on the system bus side of the bridge/graphics controller 511 (with decoding logic being located in the system bus slave interface 707), then the same address is not responded to on the expansion bus side of the bridge (with decoding of expansion bus addresses being performed by logic located in the expansion bus slave interface 709), except for accesses to the control registers 713 and the frame buffer 517.

Four different expansion bus address spaces are defined (by the values stored in respective base registers located in the control registers 713) for accesses made from the system bus 501. That is, an agent on the system bus 501 may attempt to make expansion bus (e.g., PCI) configuration accesses, expansion bus memory accesses, control register accesses, and frame buffer accesses.

Figure 9:
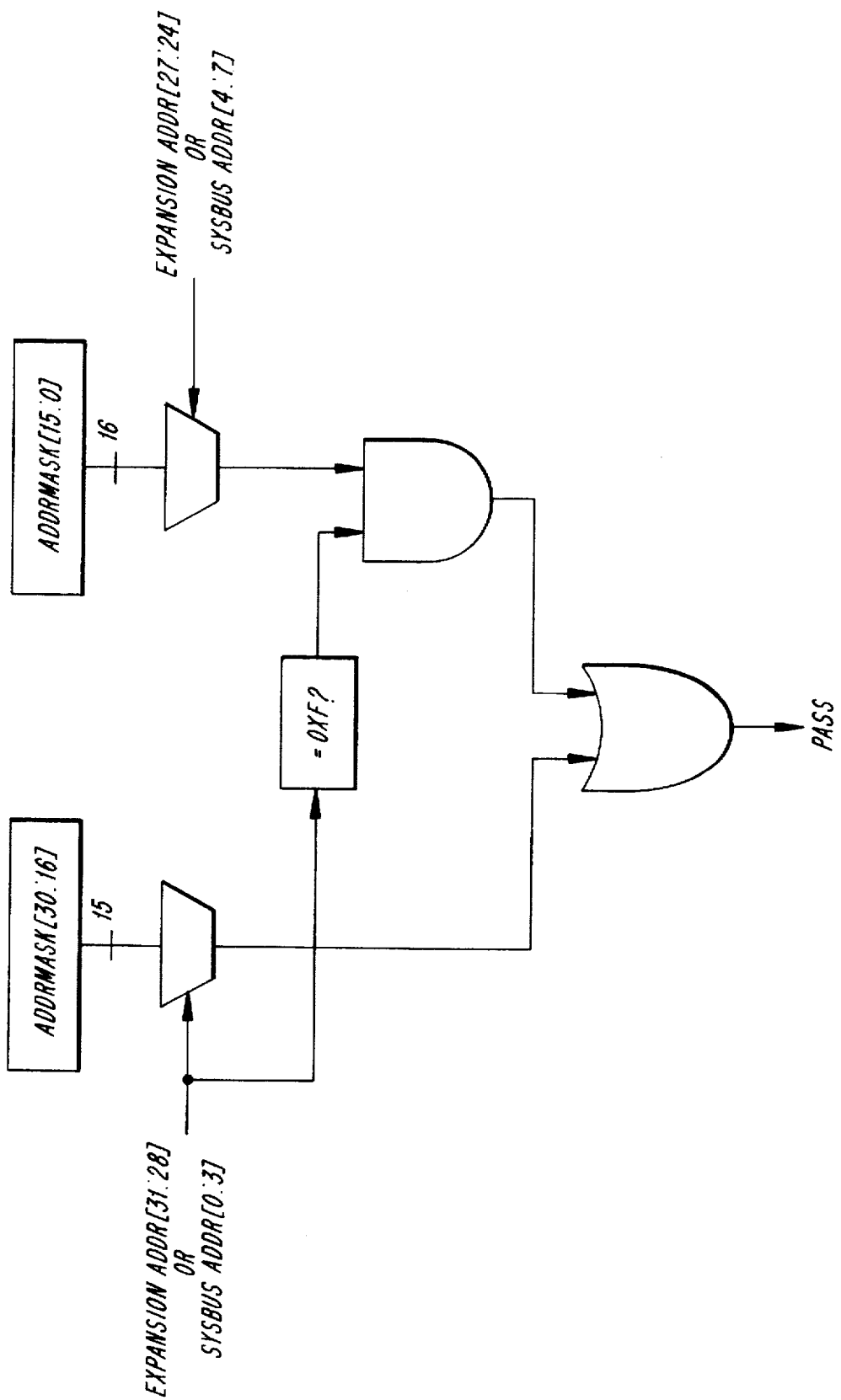
FIG. 9 is a logic diagram of the address space decode function in accordance with the present invention.

The expansion bus configuration address space and configuration data registers preferably each reside at respective hardwired addresses. An address range is preferably defined within which are mapped the Base Address 0 Register, the Base Address 1 Register, the Frame Buffer base address register, and all of the well-known expansion bus (e.g., PCI) configuration registers. The Base Address 0 Configuration register defines which 256 MByte regions are passed through from the system bus 501 to the expansion bus 529 for expansion cards and other devices. The contents of the Base Address 0 Configuration register are defined as a 16-bit Coarse Address Select field and a 16-bit Fine Address Space Select field. The Coarse Address Select field defines what coarse (256 MB) regions of memory are passed from the system bus 501 to the expansion bus 529. If a given bit in this field is set, addresses on the system bus 501 with the matching bits SysBusAddr[0:3] are passed from the system bus 501 to the expansion bus 529 while the same address values on the expansion bus 529, AD[31:28], are not passed to the system bus 501. If a given bit in this field is not set, addresses on the system bus 501 with the matching bits SysBusAddr|0:3| are not passed from the system bus 501 to the expansion bus 529 while the same address values on the expansion bus AD|31:28|, are passed to the system bus 501. FIG. 9 illustrates this decode function.

The fine address select field in the Base 0 Address Register defines what fine (16 MB) regions of memory are passed from the system bus 501 to the expansion bus 529 when system bus address |0:3|=0×F. If a given bit in this field is set, addresses on the system bus 501 with the matching bits |4:7| are passed from the system bus 501 to the expansion bus 529 while the same address values on the expansion bus 529 are not passed to the system bus 501. If a given bit in this field is not set, addresses on the system bus 501 with the matching bits |4:7| are not passed from the system bus 501 to the expansion bus 529 while the same address values on the expansion bus 529 are passed to the system bus 501. FIG. 9 illustrates this decode function.

The control registers 713 are also preferably memory mapped for access by an agent on the system bus 501. The memory space of the control registers 713 is preferably programmable, and is determined by the value loaded into the Base Address 1 Configuration Register. The control registers preferably store the following information:

Currentline: indicates which line of video is currently being displayed.

VFPEQ: Controls the Graphics Vertical Front Porch Equalization starting point.

VFP: Controls the Vertical Front Porch starting point.

VAL: Controls the Graphics Vertical Active Area starting point

VBP: Controls the Vertical Back Porch starting point (without equalization).

VBPEQ: Controls the Vertical Back Porch starting point (with equalization).

VSYNC: Controls the Vertical Sync starting point.

VHLINE: Controls the Half Lines in a Field.

PIPED: Controls the Early Hblank point.

HPIX: Controls the Horizontal Pixels Count.

HFP: Controls the Graphics Horizontal Front Porch starting point.

HAL: Controls the Graphics Horizontal Active starting point.

HBWAY: Controls the Graphics Horizontal Breezeway starting point.

HSP: Controls the Graphics Horizontal Sync starting point.

HEQ: Controls the Horizontal Equalizations starting point.

HLFLN: Controls the Half Line point of Active Video.

HSERR: Controls the Horizontal Serration's starting point.

GBASE: Contains the Graphics Base Address |21:5| value. This address indicates where the first pixel of graphics memory is located in VRAM 559.

Row_Words: Contains the Graphics Rowwords value. Rowwords is the number added to the address of the first pixel on any line of Graphics to find the first pixel on the very next line of Graphics.

MON_Sens: includes information reflecting the state of the Monitor ID pins and whether particular Monitor outputs are enabled.

Enables: Controls a variety of features within the bridge/graphics controller. For example, various monitor sync and blank signals (generated by the video timing logic 715) can be enabled or disabled. Also controls: whether graphics memory is 128 bits wide or 64 bits wide and whether the VRAM state machines generate 50 MHz or 33 MHz waveforms; whether the VRAM state machines 719 detect page hits on the system bus 501 to frame buffer 517 single beat writes; whether the shift clock is to be generated and whether data transfers are to be performed for the standard bank of VRAM; whether double buffering is to be enabled, whereby the same data transfers are generated for both the standard bank of VRAM 559-1 and the optional bank 559-2; whether the system 500 is in big-endian or little-endian mode; and whether the monitor being controlled is Progressive or Interlaced.

GSCDivide: Controls the Graphics clock divide count, which determines the rate at which data is shifted out of VRAM 559 and loaded into the RAMDAC 523.

RefreshCount: Contains the count of system bus clocks used to generate refresh cycles to the VRAMs 559. In a preferred embodiment, the VRAMs need to be refreshed every 15.6 microseconds.

Interrupt Enable: enables/disables/clears a number of interrupts to the primary processor, including vertical blank interrupt; system bus write error interrupt; and expansion bus write error interrupt.

Interrupt Status: indicates which interrupts have occurred.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the invention may be used with bus architectures other than those indicated in the exemplary embodiment. The system data bus 305 and expansion bus 329 need not be 64-bits and 32-bits wide, respectively, and the smallest addressable data unit (i.e., granularity of addressability) for the buses need not be a byte as described in the exemplary embodiment. Also, it need not be the case that the system bus 301 is big-endian and the expansion bus 329 is little-endian; the invention can easily be adapted for use in a system in which the reverse is true (i.e., the system bus 301 is little-endian and the expansion bus 329 is big-endian), and also in environments in which there is no endian-ness or any other incompatibility.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a computer system, an apparatus for interconnecting a first bus, a second bus and a frame buffer, the apparatus comprising:

first port means for coupling to the first bus;

second port means for coupling to the second bus;

third port means for coupling to the frame buffer;

data path means for switchably routing data received from any of the first, second and third port means to any other one of the first, second and third port means, first bus slave interface means comprising:

means for receiving, from a first agent connected to the first bus, a first request to access a second agent connected to the second bus; and means for forwarding the received first request to a second bus master interface means;

the second bus master interface means, comprising:

means for converting the first request into a second request that is suitable for transmission on the second bus, and for transmitting the second request on the second bus; and means for controlling the data path means to alternatively route data from the first bus to the second bus, or from the second bus to the first bus in response to the first request alternatively being a write or a read request;

wherein the first bus slave interface means further comprises:

means for receiving, from the first agent connected to the first bus, a third request to access the frame buffer; and means for forwarding the third request to a frame buffer interface means; and the frame buffer interface means for controlling the data path means and the frame buffer to alternatively route data from the first bus to the frame buffer, or from the frame buffer to the first bus in response to the third request alternatively being a frame buffer write or a frame buffer read request.

2. The apparatus of claim 1, wherein the first bus and the second bus are of incompatible bus architectures.

3. The apparatus of claim 2, wherein the first bus is a loosely coupled bus having split-bus transaction capability, and wherein the second bus is a tightly ordered bus.

4. The apparatus of claim 1, wherein:

the data path means are fabricated on a first integrated circuit;

the first bus slave interface means, the second bus master interface means, and the frame buffer interface means are all fabricated on a second integrated circuit;

the first integrated circuit further includes:

means for coupling to a data bus portion of the first bus;

means for coupling to a data bus portion of the second bus;

means for coupling to a frame buffer data bus; and means for coupling to a bridge control signal interface; and the second integrated circuit further includes:

means for coupling to address bus and control line portions of the first bus;

means for coupling to address bus and control line portions of the second bus;

means for coupling to a frame buffer control interface; and the bridge control signal interface for providing control signals for operating the data path means.

5. The apparatus of claim 4, wherein the bridge control signal interface comprises:

means for generating data path control signals associated with transactions that include movement of data alternatively to or from the first bus;

means for generating data path control signals associated with transactions that include movement of data alternatively to or from the second bus;

means for generating data path control signals associated with transactions that include movement of data alternatively to or from the frame buffer.

6. The apparatus of claim 5, further comprising means for generating an endian mode signal for indicating an endian mode of operation of a processor connected to the first bus.

7. The apparatus of claim 6, wherein the means for generating data path control signals associated with transactions that include movement of data alternatively to or from the first bus include:

means for generating a signal indicating whether a transaction emanating from the first bus is a read or a write operation;

means for generating a signal indicating whether an intended recipient of a transaction emanating from the first bus is the frame buffer or the second bus;

means for generating a signal indicating that no addresses associated with read or write operations emanating from the first bus and being directed alternatively to the frame buffer or to the second bus are stored within the second integrated circuit;

means for generating a signal indicating that a transaction emanating from the first bus involves a data burst phase;

means for generating a signal indicating that a transaction emanating from the second bus and being directed to the first bus is alternatively a read or a write operation;

means for generating a signal indicating that no transactions emanating from the second bus and being directed to the first bus are waiting for a data tenure to occur on the first bus; and means for generating a signal indicating that a transaction emanating from the second bus and being directed to the first bus requires that a data burst phase be performed on the first bus.

8. The apparatus of claim 6, wherein the means for generating data path control signals associated with transactions that include movement of data alternatively to or from the second bus comprises:

means for generating a signal indicating that the second bus is idle;

means for generating a signal that causes data to be loaded from the second bus into first memory means for storing data associated with a read operation emanating from the first bus and directed to the second bus, wherein the first memory means are included in the first integrated circuit;

means for generating a signal that causes data to be loaded from the second bus into second memory means for storing data associated with a write operation emanating from the second bus and directed to the first bus, wherein the second memory means are included in the first integrated circuit;

means for generating a signal that causes data to be loaded from the second bus into third memory means for storing data associated with a write operation emanating from the second bus and directed to the frame buffer, wherein the third memory means are included in the first integrated circuit;

means for generating a signal that causes data to be loaded from the first bus into fourth memory means for storing data associated with a write operation emanating from the first bus and directed to the second bus;

means for generating a signal that causes data to be loaded from the first bus into fifth memory means for storing data associated with a read operation emanating from the second bus and directed to the first bus; and means for generating a signal indicating that an abort is occurring, whereby actions associated with an ongoing bus cycle are terminated.

9. The apparatus of claim 6, wherein the means for generating data path control signals associated with transactions that include movement of data alternatively to or from the frame buffer comprises:

> means for generating a signal indicating that a frame buffer pixel depth is alternatively thirty-two bits per pixel, sixteen bits per pixel, or eight bits per pixel;
>
> means for generating a signal indicating that a current operation is a write from the second bus to the frame buffer;
>
> means for generating a signal indicating that the current operation is a read from the frame buffer to the second bus;
>
> means for generating a signal indicating that the current operation is a write from the first bus to the frame buffer;
>
> means for generating a signal indicating that the current operation is a read from the frame buffer to the first bus;
>
> means for generating a signal indicating that data associated with the current operation should be strobed.

10. The apparatus of claim 9, wherein the means for generating data path control signals associated with transactions that include movement of data alternatively to or from the frame buffer further comprises means for generating a signal indicating that an agent connected to either of the first and second buses is accessing a little-endian aperture of the frame buffer.

11. The apparatus of claim 1, further comprising:

> second bus slave interface means comprising:
>
>> means for receiving, from a third agent connected to the second bus, a fourth request to access a fourth agent connected to the first bus; and
>>
>> means for forwarding the received fourth request to a first bus master interface means;
>
> the first bus master interface means, comprising:
>
>> means for converting the fourth request into a fifth request that is suitable for transmission on the first bus, and for transmitting the fifth request on the first bus; and
>>
>> means for controlling the data path means to alternatively route data from the second bus to the first bus, or from the first bus to the second bus in response to the fourth request alternatively being a write or a read request.

12. The apparatus of claim 11,

> wherein the second bus slave interface means further comprises:
>
>> means for receiving, from the third agent connected to the second bus, a sixth request to access the frame buffer; and
>>
>> means for forwarding the sixth request to the frame buffer interface means,
>
> and wherein further the frame buffer interface means controls the data path means and the frame buffer to alternatively route data from the second bus to the frame buffer, or from the frame buffer to the second bus in response to the sixth request alternatively being a second frame buffer write request or a second frame buffer read request.

* * * * *